Patented Apr. 27, 1954

2,676,904

UNITED STATES PATENT OFFICE 2,676,904

CHEMICAL METHOD FOR INTRODUCTION OF 11-HYDROXYL SUBSTITUENTS INTO STEROIDS

Roger Jeanloz, Oscar Hechter, and Gregory Pincus, Worcester, and Victor Schenker, Shrewsbury, Mass., assignors to G. D. Searle & Co., Chicago, Ill., a corporation of Illinois No Drawing. Application November 29, 1950, Serial No. 198,251

4 Claims. (Cl. 195—51)

This invention relates to enzymatic methods of introducing hydroxyl groups into steroids. More particularly it relates to methods of introducing hydroxyl groups into steroids in the 11, 17 and 21 positions by treating steroids with adrenal cortex enzymes.

By our method it is possible to convert 11-desoxycorticosterone into corticosterone. It is likewise possible to convert other steroids such as $\Delta^4$-androstene - 3,17 - dione, progesterone, pregnenolone, and 17-hydroxyprogesterone into the corresponding substances containing a hydroxyl substituent in the 11-position, namely, 11-hydroxy - $\Delta^4$ - androstene-3,17-dione, 11-hydroxyprogesterone, corticosterone and 17-hydroxycorticosterone, respectively.

Steroids containing hydroxyl substituents in the 11, 17 and 21 positions are useful as medicinal agents, particularly in the treatment of rheumatoid arthritis. Likewise certain hydroxylated steroids such as corticosterone are of great interest as natural adrenal hormones. Such substances are very difficult to produce by chemical methods and therefore our enzymatic procedure is a valuable method for obtaining hydroxy steroids.

It is the object of this invention to provide simple and economical methods for introducing hydroxyl groups into steroids. It is a further object to provide methods for obtaining hydroxylated steroids in sufficient quantities at low cost for use in clinical medicine.

By our procedure the adrenal cortex of a mammal, such as horse, sheep, pig, cattle and the like, is comminuted, sliced, chopped, hashed, minced, ground or homogenized with a dilute saline solution, such as 1.15 normal potassium chloride solution, at low temperature. The resulting mixture may be filtered or strained to remove particles of tissue or the mixture or brei may be employed without further treatment. The steroid may be suspended in the aqueous homogenate or brei, or a solution of the steroid in an inert solvent such as propylene glycol may be added to the enzyme preparation. The resulting mixture or solution of enzyme and streoid is incubated at low temperature with exposure to air or oxygen for several hours with gentle agitation. During this time the enzyme or enzymes bring about oxidation of the steroid with the resulting introduction of 11-hydroxyl groups. The reaction mixture can then be dialyzed and the steroid material in solution passes through the membrane and is separated from the enzyme and proteinaceous material. The aqueous solution of the steroid may then be treated with activated carbon whereupon the steroid is adsorbed. The steroid may be removed from the charcoal by extraction with organic solvents such as acetone, chloroform, methylene chloride and benzene.

Alternatively the reaction mixture containing the enzyme and the steroid may be treated directly with activated charcoal causing the steroid to be adsorbed on the charcoal. The steroid may be removed from the charcoal as above. From the extract of the charcoal with the organic solvent there is obtained a steroid fraction which is generally non-crystalline since it contains both starting material and hydroxylated material. The pure steroids may be isolated from this mixture by procedures such as chromatographic separation or by crystallization technics. The oxidation procedure is generally carried out at temperatures in the range of 0° to 38° C. Best yields are generally obtained at low temperatures with reduced yields at temperatures above room temperature. At temperatures as high as 75° C. there is still some oxidation but the yield is significantly reduced. We have observed that the oxidation is strikingly inhibited by the presence of cyanide ions in concentrations of 0.02 normal and higher. At low concentrations the inhibitions are very slight.

The following examples illustrate methods for carrying out our reactions. In these examples parts by weight are given in grams (g.), milligrams (mg.) and micrograms ($\gamma$), parts by volume in milliliters (ml.) and liters, and temperatures are recorded in degrees centigrade (° C.). In some instances concentrations of aqueous solutions are reported in terms of normality, for which the symbol N is used.

Example 1

5 g. of beef adrenal cortex were homogenized with 25 ml. of 1.15 N potassium chloride solution at 5° C. for 1–2 minutes in a Waring blender. Then 5 mg. of desoxycorticosterone, dissolved in 0.1 ml. of propylene glycol, were added to the resulting homogenate. The mixture was slowly shaken in a 250-ml. container for 3 hours at 37° C. The mixture was then transferred to a cellophane tube and dialyzed against a suspension of 0.1 g. of activated carbon in 15 ml. of a salt solution (7 g. of sodium chloride and 4.5 g. of sodium citrate hydrate in 1 liter of water) and slowly shaken for three days at 5° C. Then the charcoal was filtered off on a filter covered with a filter aid. The charcoal filter cake was then extracted with three 10-ml. portions of boiling acetone. The acetone extracts were combined and evaporated under nitrogen at reduced pressure. There was obtained in this way a residue of 4.4 mg. of noncrystalline steroids. This was taken up in benzene and passed over a column of silica gel. Upon elution with a mixture of benzene and ether (1:2) there was obtained 1.2 mg. of steroids. After elution of the column with ether, a similar elution with a mixture of ether and ethyl acetate (1:1) gave a fraction of steroid material weighing 0.6 mg. From the benzene ether elution there was obtained crystalline desoxycorticosterone and from the ether ethyl acetate solution there was obtained corticosterone.

Example 2

An experiment carried out in the same way as Example 1, but modified by conducting the oxidation at 37° C. for 15 hours instead of 3 hours, yielded 1.0 mg. of desoxycorticosterone fraction and 0.8 mg. of corticosterone fraction.

Example 3

An oxidation was conducted as in Example 1 but modified by the addition of 10 mg. of sodium fluoride to the enzyme homogenate. There was obtained from this experiment 0.6 mg. of corticosterone after dialysis, adsorption on charcoal, and chromatographic separation.

Example 4

25 g. of adrenal cortex were homogenized in a Waring blender with 50 ml. of iced 1.5% potassium chloride solution for 2 minutes. The homogenate was strained through muslin and then filtered through coarse filter paper. The homogenization and filtrations were conducted in a cold room at 2° C. The resulting enzyme solution was divided into four equal portions and these were maintained for 30 minutes each at 0°, 22°, 38°, and 75° C. After 30 minutes 5-ml. portions of each of these enzyme solutions were incubated with 0.5 ml. of N/15 phosphate buffer solution (pH 7.3) and 125 mg. of 11-desoxycorticosterone in 0.25 ml. of propylene glycol for 150 minutes. From each of the oxidation mixtures the steroids were isolated by use of dialysis, adsorption on charcoal, and chromatographic separation on silica gel as in Example 1. The following results were obtained:

| Temperature of enzyme extract prior to experiment | Total steroids isolated | Percentage of steroids equivalent to corticosterone |
|---|---|---|
| 2° | 550γ | 55 |
| 22° | 509 | 53 |
| 38° | 498 | 27 |
| 75° | 508 | 8 |

Example 5

25 g. of adrenal cortex were homogenized with 50 ml. of iced 1.15 N potassium chloride solution for 2 minutes as in Example 4. Then 25 mg. of progesterone dissolved in 0.5 ml. of propylene glycol were added to the resulting homogenate. The mixture was slowly agitated in a 250 ml. container for 3 hours at 10° C. It was then transferred to a cellophane tube and dialyzed against 1 g. of activated charcoal in 75 ml. of sodium citrate-sodium chloride solution for 3 days at 10° C. as in Example 1. The charcoal was separated and extracted exhaustively with methylene chloride in a Soxhlet apparatus. The methylene chloride extract was evaporated under nitrogen at reduced pressure. The residue was dissolved in benzene and chromatographed on silica gel. The column was developed with benzene-ethyl acetate mixtures and then eluted with ethyl acetate. The ethyl acetate eluate was evaporated under nitrogen at reduced pressure and gave a residue of non-crystalline steroids weighing 6 mg. This material was dissolved in benzene and rechromatographed as above. After the column was eluted with benzene ethyl-acetate mixtures, it was eluted with ethyl acetate and from this eluate was obtained 1.4 mg. of crystalline 17-hydroxycorticosterone melting at 199–201° C.

Example 6

25 ml. of adrenal cortex homogenate were prepared at 5° C. by the method of Example 1. To this solution was added a solution of 10 mg. of $\Delta^4$-androstene-3,17-dione in 0.3 ml. of propylene glycol. The resulting solution was agitated slowly at 5° C. for 2 hours in a 250 ml. container. The resulting mixture was dialyzed against a suspension of 0.5 g. of activated charcoal in 15 cc. of salt solution as in Example 1. The charcoal was removed and extracted with methylene chloride in a Soxhlet apparatus. The methylene chloride solution was evaporated under nitrogen at reduced pressure and the residue was taken up in benzene-petroleum ether (1:1) and passed over a silica gel column. The column was developed successively with benzene, benzene-ether mixtures, and ether. Elution with ether-ethyl acetate (9:1) removed 11$\beta$-hydroxy-$\Delta^4$-androstene-3,17-dione. This product, after recrystallization from a mixture of ether and petroleum ether, melted at 194–199° C.

Example 7

50 g. of beef adrenal cortex were homogenized with 200 ml. of 1.15 N potassium chloride solution at 2° C. for 5 minutes in a Waring blender. The resulting homogenate was filtered through muslin and then coarse filter paper, the temperature of the mixture being kept below 5° C. To the resulting enzyme solution were added a solution of 100 mg. of desoxycorticosterone in 2 ml. of propylene glycol and 2.5 ml. of a solution of N/15 phosphate buffer. The resulting solution was kept at 5° C. for 3 hours. It was then dialyzed for 3 days at 5° C. in a cellophane tube against sodium citrate-sodium chloride solution containing 2 g. of activated charcoal as in Example 1. The charcoal was separated and extracted with boiling methylene chloride in a Soxhlet apparatus. The extract was evaporated under nitrogen at reduced pressure. The residue of steroids was combined with similar steroid residues from five such experiments, dissolved in benzene and passed through a column of silica gel. The column was then developed by elution with benzene containing progressively larger amounts of ether. From the eluate with benzene-ether (1:2) was obtained a steroid fraction (A) containing 140 mg. of formaldehydrogenic steroids by the periodic acid method ("The Hormones" by Pincus and Thimann, vol. I, page 613, 1948). The column was subsequently eluted with benzene-ether mixtures of 1:3, 1:5 and 1:10 concentrations, and then with ether. After the ether elution, mixtures of ether-ethyl acetate were employed. From ether-ethyl acetate (1:1) was obtained a steroid fraction (B) containing 80 mg. of formaldehydogenic steroids.

Fraction A was redissolved in ether and chromatographed again on silica gel. Elution as above gave a yield of crystalline desoxycorticosterone weighing 90 mg. and melting at 138–140° C. after recrystallization from ethyl acetate-petroleum ether.

Fraction B was dissolved in benzene and passed over another silica gel column. The column was developed with benzene-ether mixtures as above, then with ether, and finally with ether-ethyl acetate mixtures. The ether-ethyl acetate (1:1) eluate, after evaporation under nitrogen at reduced pressure, gave 40 mg. of crystalline corticosterone. The latter, after recrystallization from a mixture of ethyl acetate and neohexane, melted at 177–180° C.

We claim:

1. The method of introducing an 11-hydroxyl substituent into a steroid containing an 11-methylene group which comprises mixing said steroid with a brei made from the adrenal cortex and subjecting the resultant mixture to the action of oxygen.

2. The method of introducing an 11-hydroxyl substituent into a steroid containing an 11-methylene group which comprises mixing said steroid with a brei made from the adrenal cortex and subjecting the resultant mixture to the action of oxygen at temperatures below about 75° C.

3. The method of oxidizing 11-desoxycorticosterone to corticosterone which comprises mixing 11-desoxycorticosterone with a brei made from the adrenal cortex and subjecting the resultant mixture to the action of oxygen.

4. The method of oxidizing 11-desoxycorticosterone to corticosterone which comprises mixing 11-desoxycorticosterone with a brei made from the adrenal cortex and subjecting the resultant mixture to the action of oxygen at temperatures below about 75° C.

References Cited in the file of this patent

UNITED STATES PATENTS

| Number | Name | Date |
|---|---|---|
| 1,994,992 | Haas et al. | Mar. 19, 1935 |
| 2,260,085 | Milas et al. | Oct. 21, 1941 |
| 2,360,447 | Schmidt et al. | Oct. 17, 1944 |
| 2,447,325 | Gallagher | Aug. 17, 1948 |

OTHER REFERENCES

Hayano et al., Proc. Soc. Exptl. Bio. and Medicine, vol 72, December 1949.

Hechter et al., J. Am. Chem. Soc., Sept. 1949, vol. 71, pp. 3261-2.

Notice of Adverse Decision in Interference

In Interference No. 87,617 involving Patent No. 2,676,904, R. Jeanloz, O. Hechter, G. Pincus, and V. Schenker, Chemical method for introduction of 11-hydroxyl substituents into steroids, final judgment adverse to the patentees was rendered December 7, 1956, as to claim 1 and 3.

[*Official Gazette January 22, 1957.*]